Sept. 4, 1928.                        1,682,795
A. MORGAN
RAKE
Filed Dec. 20, 1926
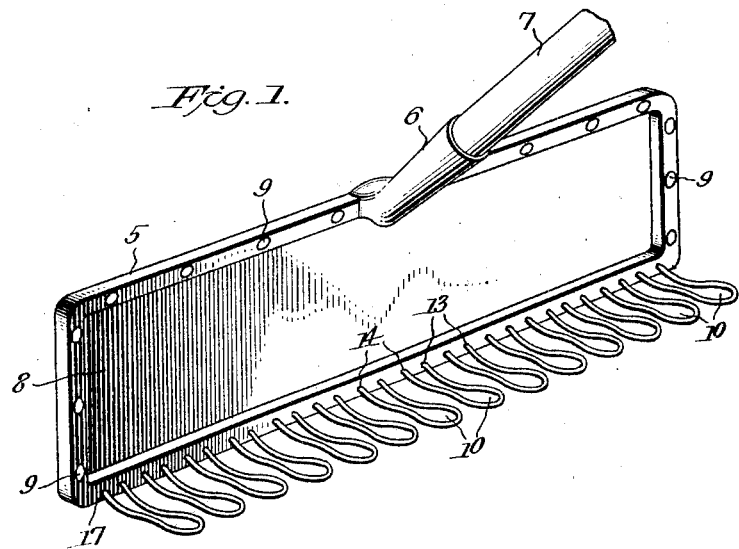
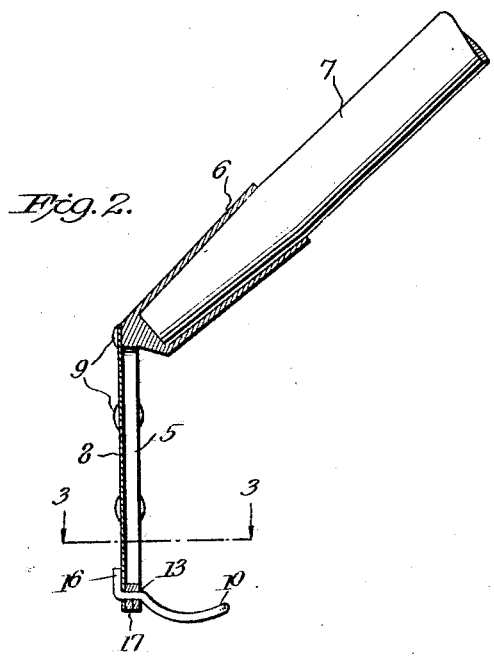
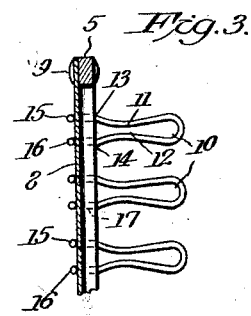
Inventor,
Albert Morgan,
By Frank S. Ackerman,
Attorney.

Patented Sept. 4, 1928.

1,682,795

UNITED STATES PATENT OFFICE.

ALBERT MORGAN, OF INDIANAPOLIS, INDIANA.

RAKE.

Application filed December 20, 1926. Serial No. 155,954.

This invention relates to rakes of the hand type, and has for an object the provision of novel means whereby a rake may be moved backward and forward over a surface from which leaves and other deposits are to be removed, without unduly disturbing the soil; and it is a further object of the invention to provide novel means whereby the material collected will be carried on the teeth of the rake and held against dislodgment therefrom until the capacity of the retaining means is reached.

It is a still further object of this invention to produce a rake having teeth that are without sharp points, a condition which lends itself to the result of collecting material without disturbing the soil to any appreciable extent.

It is furthermore an object of this invention to produce a rake having teeth so anchored in place as to prevent displacement or likely distortion of the said teeth.

It is a still further object of the invention to produce a rake of the character indicated which will be strong and durable, as well as efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in perspective of a rake embodying the invention;

Figure 2 illustrates a sectional view through the head of the rake approximately on the line of the handle; and Figure 3 illustrates a sectional view on the line 3—3 of Fig. 2.

In the present embodiment of the invention, the head of the rake comprises a frame 5 of metal having an integral handle socket 6 to which any appropriate handle such as 7 may be applied.

The metal of the frame is of sufficient strength and rigidity to constitute an anchorage for an apron or panel 8 which, with the frame, constitutes an abutment where the material collected will be held or retained while the rake is being manipulated in gathering said material, it being seen that the apron or plate is secured to the frame by appropriate fastenings 9 such as rivets or the like.

The teeth are all of the same construction and they consist of lengths of metal of appropriate gage doubled on themselves to form the loops 10 whose arc may, of course, be varied in the manufacture, according to the requirements, and the material of the teeth is shaped so that the two lengths converge from the loop toward the head, as shown at 11 and 12, and they then diverge at the head to form shoulders 13 and 14 which serve to prevent inward movement of the teeth with respect to the head. The shanks 15 and 16 of the teeth extend through apertures such as 17 in the head and the said shanks are shaped with angularly disposed portions that lie against the apron and they may be secured thereto, if desired, by any of the welding processes appropriate for such use, although under ordinary conditions of use, the teeth will not be displaced even if they are not attached to the apron.

The teeth are slightly convex on their lower surfaces and therefore they ride on the soil or sod or grass from which leaves and other materials are to be collected, so that when the teeth are so riding upon the surface, the operator need only pull the rake toward him and push it from him on the surface of the soil and properly guide it and it will clean itself and free the teeth of the materials being raked without ever having to disengage the particles being raked from the teeth of the rake by hand as is now commonly done. Of course by tilting the head, the proximity of the points of the teeth to the soil or surface being raked may be increased or diminished and therefore the points of the teeth can be made to scour the soil, or they may be tilted upwardly so that the teeth will ride over the soil, thus insuring the highest possible efficiency and proper results obtainable in operating the rake.

In the construction of a rake of this character, the shoulders 13 and 14 may be sharply defined, or the shoulders may be formed by slight curvatures, but in any event, the shoulders should have sufficient bearing surface to prevent axial movement of the teeth with relation to the head.

I claim:

A rake frame having a frame-like head, a handle at an angle to the frame at one of its longitudinal edges, an apron secured to the frame enclosing the opening in the frame, teeth comprising lengths of metal shaped to form loops constituting the outer ends of the teeth, the ends of the metal being extended through the frame and secured thereto, the said teeth being convex and projecting from the frame approximately at right angles at the side from which the handle projects, the said teeth including means for anchoring them to the frame.

ALBERT MORGAN.